(12) United States Patent
Takagi (10) Patent No.: US 11,611,401 B2
(45) Date of Patent: Mar. 21, 2023

(54) INFORMATION PROCESSING DEVICE AND CONTROL METHOD THEREOF

(71) Applicant: OMRON Corporation, Kyoto (JP)

(72) Inventor: Hiroaki Takagi, Takatsuki (JP)

(73) Assignee: OMRON Corporation, Kyoto (JP)

(\*) Notice: Subject to any disclaimer, the term of this patent is extended or adjusted under 35 U.S.C. 154(b) by 130 days.

(21) Appl. No.: 17/278,328

(22) PCT Filed: Sep. 20, 2019

(86) PCT No.: PCT/JP2019/036869
§ 371 (c)(1),
(2) Date: Mar. 21, 2021

(87) PCT Pub. No.: WO2020/080032
PCT Pub. Date: Apr. 23, 2020

(65) Prior Publication Data
US 2021/0351854 A1  Nov. 11, 2021

(30) Foreign Application Priority Data
Oct. 16, 2018 (JP) .............................. JP2018-195178

(51) Int. Cl.
H04B 17/17 (2015.01)
H04B 17/336 (2015.01)
H04B 17/318 (2015.01)

(52) U.S. Cl.
CPC ........... *H04B 17/336* (2015.01); *H04B 17/17* (2015.01); *H04B 17/318* (2015.01)

(58) Field of Classification Search
CPC .... H04B 17/336; H04B 17/17; H04B 17/318; H04B 3/46; G06K 9/00503;
(Continued)

(56) References Cited

U.S. PATENT DOCUMENTS 5,930,749 A * 7/1999 Maes ..................... G10L 25/78
                                                     704/262
10,187,179 B1 * 1/2019 Jorgovanovic ........ H04L 1/0026
(Continued)

FOREIGN PATENT DOCUMENTS

CN          1627793        6/2005
CN        107783495        3/2018
(Continued)

OTHER PUBLICATIONS

Wei Zheng, Leiming Zhang and Yong Lei, "Experimental study on the intermittent connection problems on CAN network," 2015 Chinese Automation Congress (CAC), 2015, pp. 946-951, doi: 10.1109/CAC.2015.7382634 (Year: 2015).*

"Search Report of Europe Counterpart Application", dated Jun. 23, 2022, pp. 1-8.

(Continued)

*Primary Examiner* — Edan Orgad
*Assistant Examiner* — Malick A Sohrab
(74) *Attorney, Agent, or Firm* — JCIPRNET (57) ABSTRACT

The present invention identifies the cause of an anomaly, if any, in a signal input via a cable. A master device (13) comprises an acquisition unit (1321) which acquires the signal quality of a signal input via a cable, and a cause determination unit (1323) which performs cause determination for determining, from variations in the signal quality, whether the cause of noise included in the signal is due to a mechanical factor or is due to electrical noise.

16 Claims, 6 Drawing Sheets

(58) Field of Classification Search
CPC ........ G06K 9/00536; G06N 3/02; G06N 3/04;
G06N 3/06; G06N 3/08; G06N 3/10;
G06N 3/12; G06N 20/00
See application file for complete search history.

(56) References Cited

U.S. PATENT DOCUMENTS

| | | | |
|---|---|---|---|
| 2004/0236450 A1 | 11/2004 | Bryant et al. | |
| 2005/0207346 A1* | 9/2005 | Chu | H04L 1/0045 370/241 |
| 2006/0271986 A1* | 11/2006 | Vogel | H04N 7/173 725/111 |
| 2008/0033718 A1* | 2/2008 | Zopf | G10L 19/005 704/229 |
| 2015/0029869 A1* | 1/2015 | Wolcott | H04L 43/50 370/242 |
| 2017/0310539 A1 | 10/2017 | Jin | |

FOREIGN PATENT DOCUMENTS

| | | |
|---|---|---|
| JP | 2000341624 | 12/2000 |
| JP | 2005311913 | 11/2005 |
| JP | 2011112549 | 6/2011 |
| JP | 2017052508 | 3/2017 |
| JP | 2018077144 | 5/2018 |
| NO | 2017054990 | 4/2017 |

OTHER PUBLICATIONS

"Office Action of China Counterpart Application" with English translation thereof, dated Mar. 2, 2022, p. 1-p. 14.

"International Search Report (Form PCT/ISA/210) of PCT/JP2019/036869", dated Dec. 3, 2019, with English translation thereof, pp. 1-2.

"Written Opinion of the International Searching Authority (Form PCT/ISA/210) of PCT/JP2019/036869", dated Dec. 3, 2019, with English translation thereof, pp. 1-10.

* cited by examiner

INFORMATION PROCESSING DEVICE AND CONTROL METHOD THEREOF

CROSS-REFERENCE TO RELATED APPLICATION

This application is a 371 application of the International PCT application serial no. PCT/JP2019/036869, filed on Sep. 20, 2019, which claims the priority benefits of Japan Patent Application No. 2018-195178, filed on Oct. 16, 2018. The entirety of each of the above-mentioned patent applications is hereby incorporated by reference herein and made a part of this specification.

BACKGROUND

Technical Field

The present invention relates to an information processing device that determines a cause of an anomaly, if any, in a signal input via a cable.

Related Art

Anomaly detection device and method for electrical wiring are known as a conventional technique. For example, Patent literature 1 discloses anomaly detection device and method for electrical wiring, which can detect even momentary disconnection and prevent complete disconnection. Specifically, the anomaly detection device disclosed in Patent literature 1 is an anomaly detection device for electrical wiring that detects an anomaly in an electrical wiring based on a current signal flowing through the electrical wiring. The anomaly detection device includes a noise detection coil that is arranged in the vicinity of the electrical wiring and detects electromagnetic noise caused by disconnection of the electrical wiring. In addition, the anomaly detection device includes a resistor that converts a current generated by the electromagnetic noise detected by the noise detection coil into a voltage, and an electromagnetic noise output part that includes a waveform measurement part which measures waveform data indicating a time-series change in a voltage applied to the resistor and outputs the waveform data.

Literature of Related Art

Patent Literature

Patent literature 1: Japanese Patent Laid-open "Japanese Patent Laid-Open No. 2011-112549 (published on Jun. 9, 2011)"

SUMMARY

Problems to be Solved

However, the above-mentioned conventional technique has a configuration for detecting disconnection of an electrical wiring, and does not have a configuration on the premise of identifying a cause of an anomaly of a signal input via an electrical wiring (cable). Therefore, in the above-mentioned conventional technique, even if there is an anomaly in the signal input via the cable, the cause cannot be identified. Therefore, there may be a problem that a user cannot take measures corresponding to the cause of the signal anomaly.

One aspect of the present invention is to realize an information processing device capable of identifying a cause of an anomaly, if any, in a signal input via a cable.

[Means to Solve Problems]

In order to solve the above-mentioned problems, an information processing device according to one aspect of the present invention includes: an acquisition unit which acquires a signal quality of a signal input via a cable; and a cause determination unit which performs cause determination for determining, from variations in the signal quality, whether the cause of noise included in the signal is due to a mechanical factor or is due to electrical noise.

In addition, a control method for information processing device according to one aspect of the present invention includes: an acquisition step of acquiring a signal quality of a signal input via a cable; and a cause determination step of performing cause determination for determining, from variations in the signal quality, whether the cause of noise included in the signal is due to a mechanical factor or is due to electrical noise.

[Effect]

According to one aspect of the present invention, the user can take measures corresponding to the cause of the signal anomaly.

BRIEF DESCRIPTION OF THE DRAWINGS

(a) and (b) of FIG. 7 are flowcharts showing an example of a flow of cause determination processing of noise included in a signal executed by the master device according to the embodiment of the present invention.

DESCRIPTION OF THE EMBODIMENTS

[Embodiment]

Hereinafter, an embodiment according to one aspect of the present invention (hereinafter, also referred to as "the embodiment") is described with reference to the drawings.

§ 1 Application Example

Figure 2:
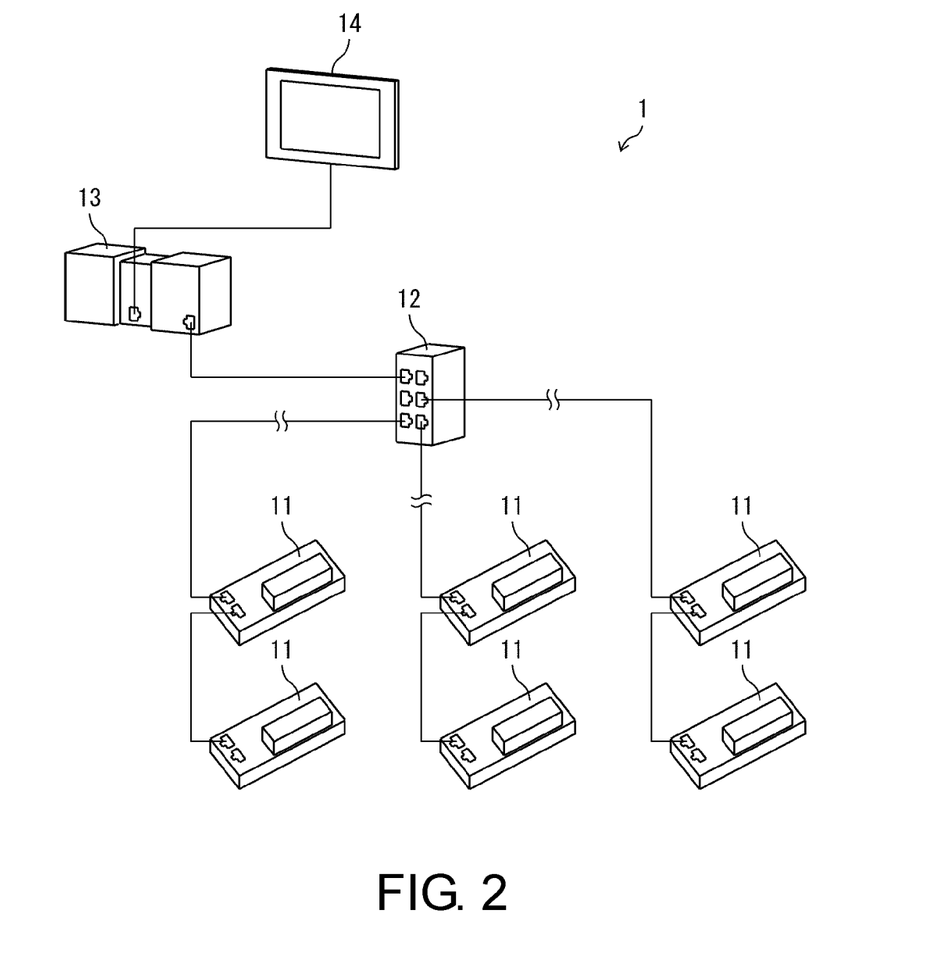
FIG. 2 is a diagram showing an example of a master-slave control system to which the master device according to the embodiment of the present invention is applied.

FIG. 2 is a diagram showing an example of a master-slave control system 1 to which a master device 13 (information processing device) according to the embodiment is applied. First, an outline of an application example of the master device 13 is described with reference to FIG. 2. As shown in FIG. 2, the master device 13 is included in the master-slave control system 1.

The master device 13 acquires, from slave devices 11 included in the master-slave control system 1, a signal quality of a signal input to the slave devices 11 via a cable. When the signal quality is poor (the signal includes noise), the master device 13 determines, from variations in the acquired signal quality, whether a cause of the noise included in the signal is due to a mechanical factor or is due to electrical noise. A frequency and/or a change width of variations in the signal quality differs depending on whether the cause of the noise is due to a mechanical factor or is due to electrical noise.

According to the above configuration, the master device 13 can determine the cause of the signal anomaly in the master-slave control system 1 from the variations in the signal quality of the signal. Therefore, a user can take measures according to the determined cause of the noise. That is, the user can appropriately respond to an anomaly in the signal input via the cable.

§ 2 Configuration Example (Master-Slave Control System 1)

The master-slave control system 1 is a system that realizes automation of a manufacturing process in a factory. As an example, as shown in FIG. 2, the master-slave control system 1 includes the slave devices 11, a signal relay device 12, the master device 13, a display/input device 14, and the like. In the master-slave control system 1, data is transmitted and received between the master device 13 and the slave devices 11 by sequentially transferring data frames on a network connecting the master device 13 and the slave devices 11. In the example shown in FIG. 2, a plurality of communication paths formed by the slave devices 11 are branched on a communication downstream side of the signal relay device 12.

Figure 3:
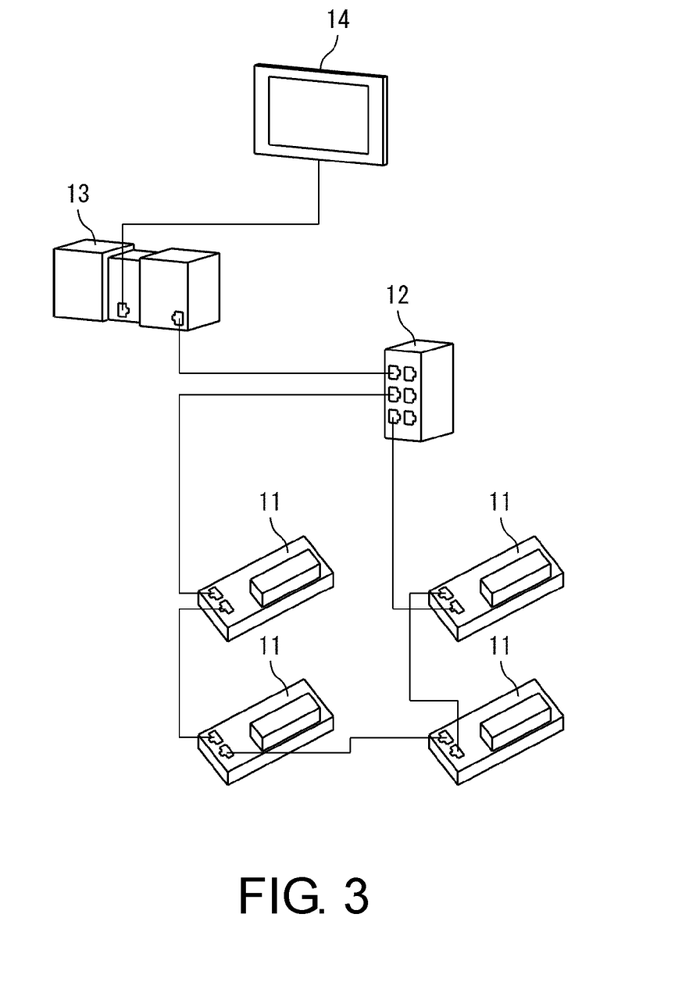
FIG. 3 is a diagram showing another example of the master-slave control system to which the master device according to the embodiment of the present invention is applied.

FIG. 3 is a diagram showing another example of the master-slave control system 1 to which the master device 13 according to the embodiment is applied. In the example shown in FIG. 3, the slave devices 11 included in the master-slave control system 1 establish one ring-like path on the communication downstream side of the signal relay device 12.

(Slave Device 11)

The slave device 11 performs one or more functions related to the manufacturing process under the control of the master device 13. The slave device 11 communicates with the master device 13 via the network and controls the drive of an external device 16 under the control of the master device 13. The slave device 11 functions as a relay device for transmitting and receiving data between the master device 13 and the external device 16.

Figure 4:
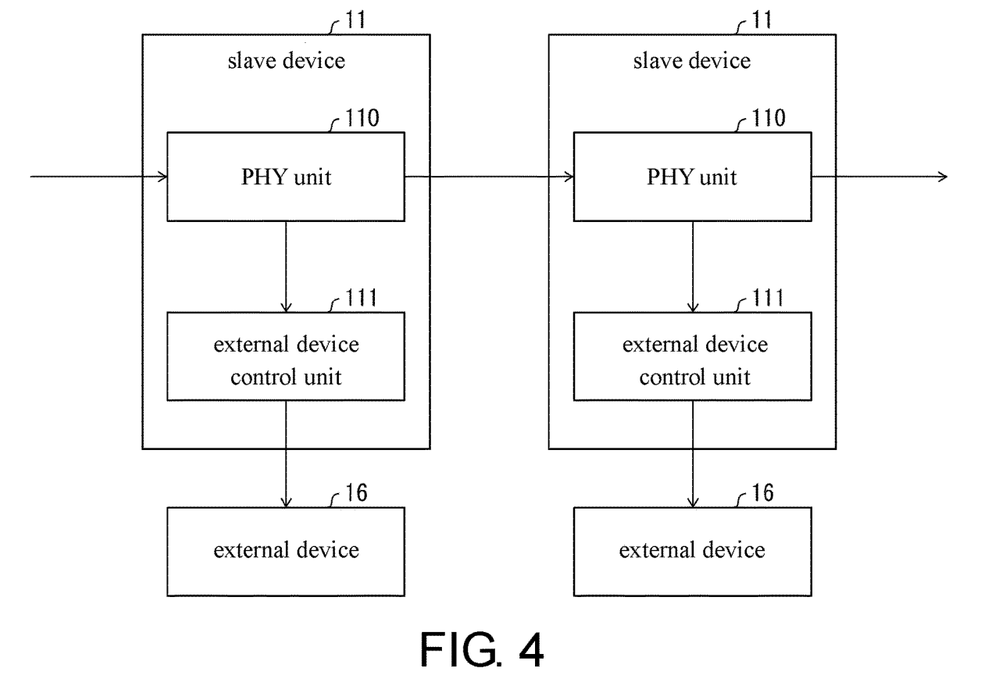
FIG. 4 is a block diagram showing an example of a configuration of a slave device according to the embodiment of the present invention.

FIG. 4 is a block diagram showing an example of a configuration of the slave device 11 according to the embodiment. As shown in FIG. 4, the slave device 11 includes a PHY unit 110 and an external device control unit 111.

(PHY Unit 110)

The PHY unit 110 is a communication unit for communication with the slave device 11 on a side closer to the master device 13 (communication upstream side) and the slave device 11 on a side farther from the master device 13 (communication downstream side). For example, the PHY unit 110 is a functional block representing a function executed by an element of a physical layer that performs communication.

Figure 5:
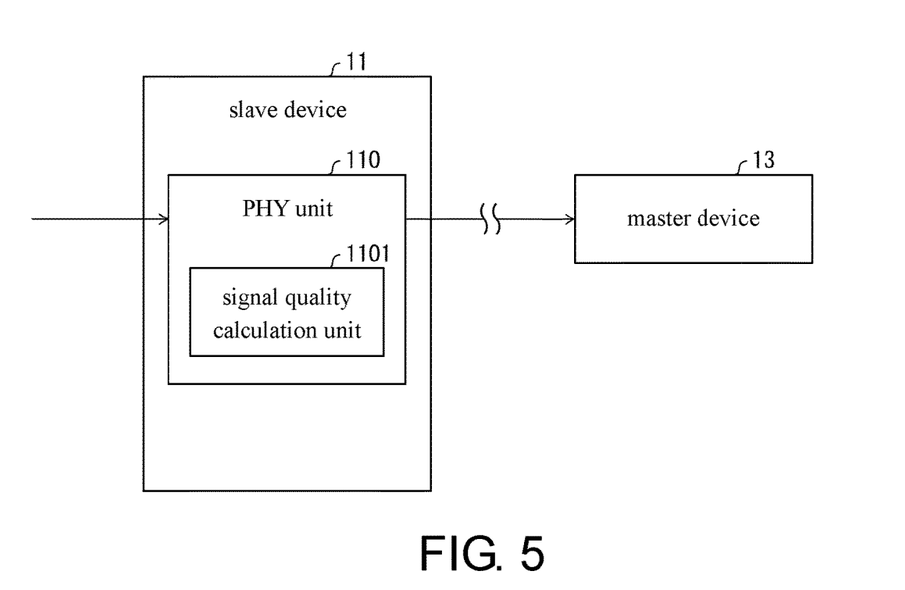
FIG. 5 is a block diagram showing an example of a configuration of a PHY unit according to the embodiment of the present invention.

FIG. 5 is a block diagram showing an example of a configuration of the PHY unit 110 according to the embodiment. As shown in FIG. 5, the PHY unit 110 includes a signal quality calculation unit 1101. The signal quality calculation unit 1101 calculates a signal quality of a signal input to the PHY unit 110 via the cable.

The signal quality calculation unit 1101 calculates, for example, an index representing a level of the noise included in the signal. The index may be, for example, a value of a signal quality indicator (SQI). The signal quality calculation unit 1101 outputs a signal indicating the calculated signal quality to the master device 13 via the other slave devices 11, the signal relay device 12, and the like.

(External Device Control Unit 111)

The external device control unit 111 controls the drive of the external device 16 under the control of the master device 13. The external device 16 is a machine such as a manufacturing device, an inspection device, or the like. The external device 16 may be input equipment such as a sensor (a temperature sensor, an optical sensor, or the like), or a switch (a push button switch, a limit switch, a pressure switch, or the like), or may be output equipment such as an actuator, a relay, a solenoid valve, or the like. In the master-slave control system 1, the master device 13 controls an operation of the external device 16 and receives output data of the external device 16 via the slave devices 11.

(Signal Relay Device 12)

The signal relay device 12 is a relay device that relays data between an upper network and the slave devices 11, the upper network including the master device 13 and the like. The signal relay device 12 is, for example, a line concentrator (hub). The signal relay device 12 can also be referred to as a slave device connected to the master device 13 via an upper bus, that is, an upper communication network.

(Master Device 13)

The master device 13 is a control device that controls the entire master-slave control system 1, and is, for example, a programmable logic controller (PLC). The master device 13 operates as a master device of the signal relay device 12 and the slave devices 11 in the master-slave control system 1. As shown in FIG. 2, the display/input device 14 and the like may be connected to the master device 13 via a connection cable or the like.

Figure 1:
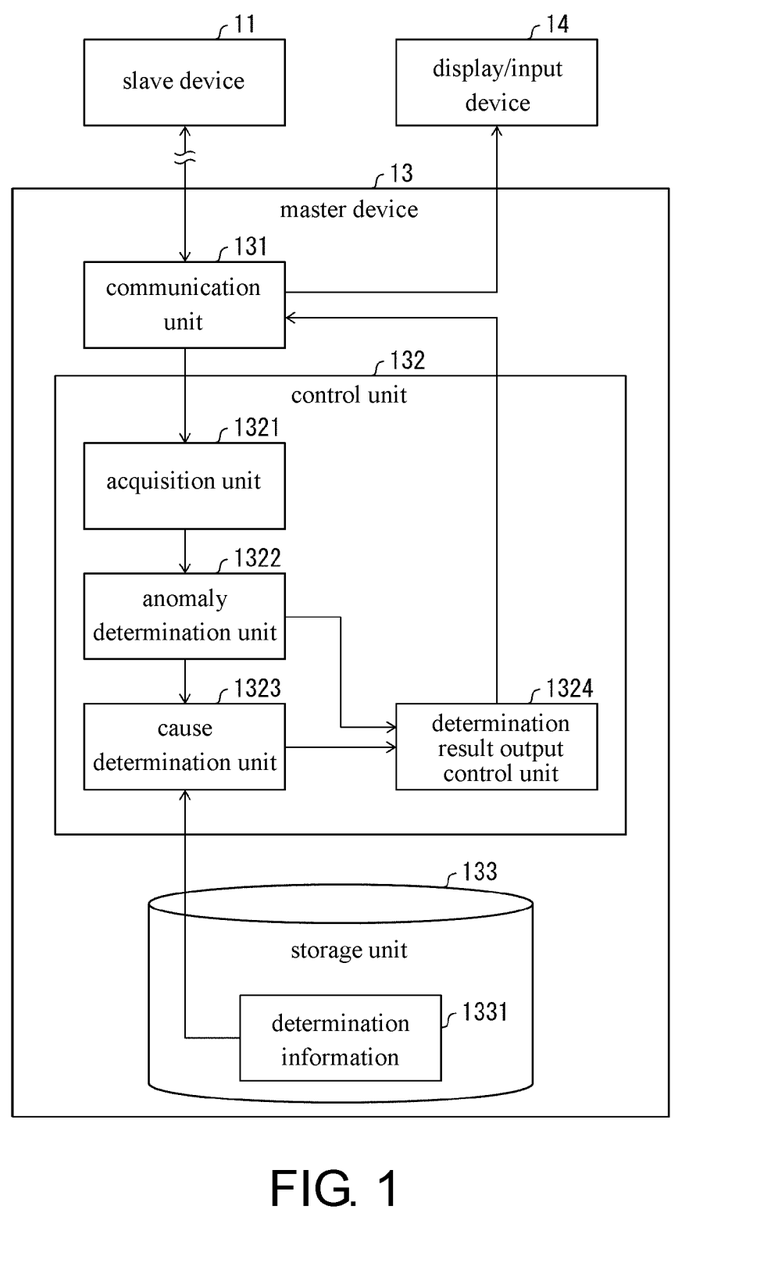
FIG. 1 is a block diagram showing a configuration of a master device according to an embodiment of the present invention.

FIG. 1 is a block diagram showing a configuration of the master device 13 according to the embodiment. As shown in FIG. 1, the master device 13 includes a communication unit 131, a control unit 132, and a storage unit 133.

(Communication Unit 131)

The communication unit 131 communicates with the slave device 11 via the signal relay device 12. In the embodiment, in particular, a signal indicating the signal quality calculated by the slave device 11 is received from the slave device 11. The communication unit 131 outputs the received signal quality to an acquisition unit 1321.

In addition, according to an instruction of a determination result output control unit 1324, the communication unit 131 outputs a signal indicating a result of determination performed by an anomaly determination unit 1322 and a cause determination unit 1323, a signal indicating the signal quality, and the like to the display/input device 14.

(Control Unit 132)

The control unit 132 includes a central processing unit (CPU), a random access memory (RAM), a read only memory (ROM), and the like, and controls each constituent element according to information processing. The control unit 132 includes the acquisition unit 1321, the anomaly determination unit 1322, the cause determination unit 1323, and the determination result output control unit 1324.

(Acquisition Unit 1321)

The acquisition unit 1321 acquires a signal indicating the signal quality calculated by the slave device 11 from the communication unit 131. The acquisition unit 1321 outputs the signal indicating the signal quality to the anomaly determination unit 1322.

(Anomaly Determination Unit 1322)

The anomaly determination unit 1322 determines, from variations in the signal quality, whether there is an anomaly in the signal input to the slave device 11.

Figure 6:
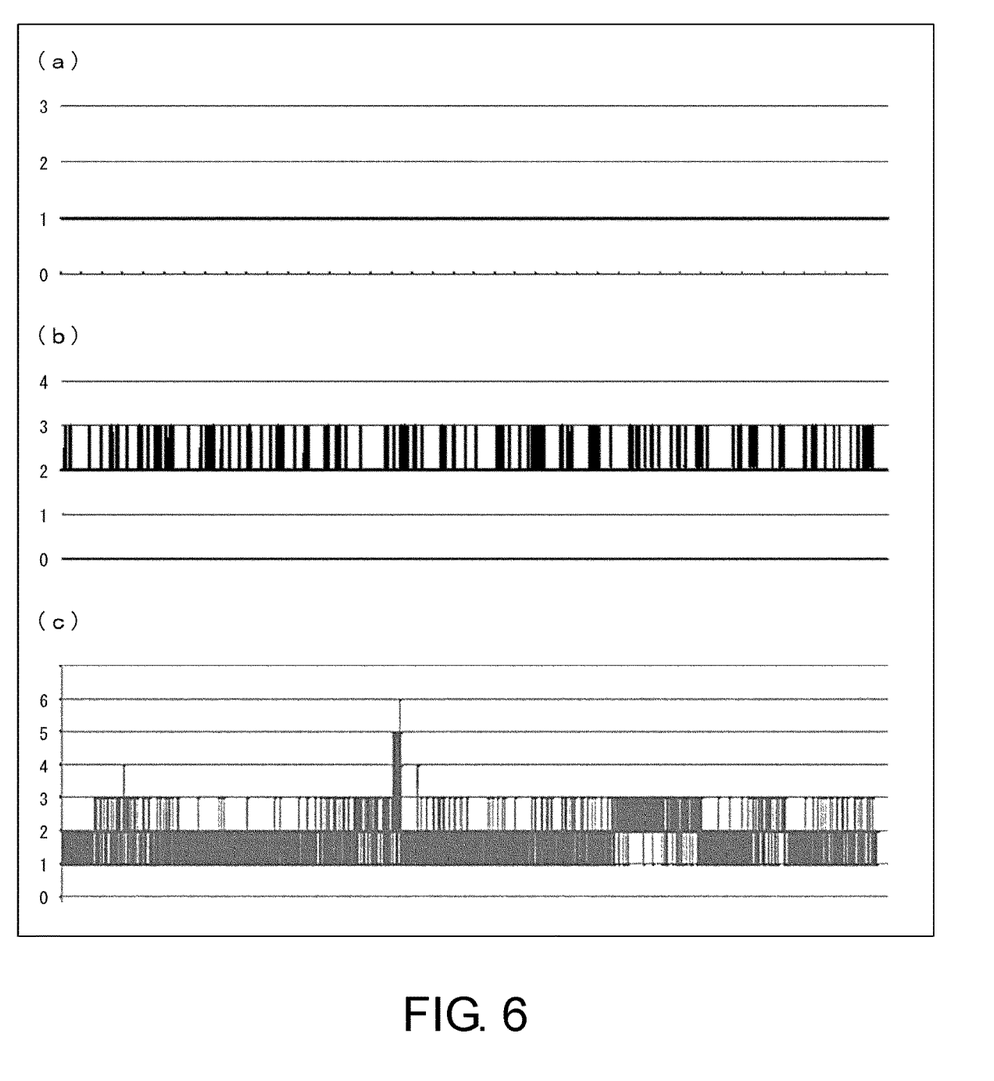
FIG. 6 is a diagram showing an example of a signal quality. (a) of FIG. 6 is a diagram showing an example of variations in the SQI value of a signal in a normal state. (b) of FIG. 6 is a diagram showing an example of variations in the SQI value of a signal including noise caused by a mechanical factor. (c) of FIG. 6 is a diagram showing an example of variations in the SQI value of a signal including noise caused by electrical noise.

FIG. 6 is a diagram showing an example of variations in the signal quality. The vertical axis shows a noise level, and the horizontal axis shows the time. (a) of FIG. 6 is a diagram showing an example of variations in the SQI value of a signal in a normal state. (b) of FIG. 6 is a diagram showing an example of variations in the SQI value of a signal including noise caused by a mechanical factor. For example, the mechanical factor includes mechanical vibration, cable disconnection, and the like.

Here, the mechanical vibration is mechanical vibration that causes noise to be mixed into the signal in the cable when electrical connection between the cable and the equipment is incomplete.

(b) of FIG. 6 is a diagram showing an example of variations in the SQI value of a signal when a part of the cable is disconnected (the cable has not been completely disconnected). (c) of FIG. 6 is a diagram showing an example of the SQI value of a signal including noise caused by electrical noise.

The electrical noise is electrical noise that is applied to the cable and mixed into the signal in the cable. For example, the electrical noise is electromagnetic noise that propagates in the air from electronic equipment installed near the cable and is mixed into the signal in the cable. In addition, other electrical noise may include, for example, conduction noise generated from a servo mechanism and mixed into the signal in the cable. The conduction noise may be mixed into the signal in the cable and cause a malfunction in the equipment to which the signal is input. The electrical noise can also be expressed as external noise.

In the example shown in (a) of FIG. 6, the SQI value does not vary from Noise level 1 in the signal in the normal state. The SQI value indicates the degree of noise included in the signal. When the SQI value is low, the signal includes little noise. In addition, when the SQI value is high, the signal includes a lot of noise. Moreover, the noise level in the signal in the normal state changes depending on a configuration of the master-slave control system 1 such as a cable length, or the like. For example, as the cable length increases, the noise level of the signal in the normal state tends to increase.

When the SQI value varies, the anomaly determination unit 1322 determines that the signal has an anomaly. If determining that the signal has an anomaly, the anomaly determination unit 1322 outputs a signal indicating the signal quality to the cause determination unit 1323.

In addition, if determining that the signal has no anomaly, the anomaly determination unit 1322 outputs a signal indicating that there is no anomaly and a signal indicating the signal quality to the determination result output control unit.

(Cause Determination Unit 1323)

The cause determination unit 1323 determines, from variations in the signal quality, whether the cause of the noise included in the signal input to the slave device 11 is due to a mechanical factor or is due to electrical noise.

In addition, the cause determination unit 1323 may perform the determination according to at least one of a frequency of the variations in the signal quality and an amplitude of the variations in the signal quality. For example, the cause determination unit 1323 may perform fast Fourier transform (FFT) on time-series data of the signal quality indicated by the acquired signal to analyze a frequency component, and use the frequency component for the determination.

For example, as shown in (b) and (c) of FIG. 6, the influence of a mechanical factor on the variations in the signal quality shows the following tendency compared with the influence of electrical noise on the variations in the signal quality.

1: The frequency of the variations in the signal quality of the signal affected by a mechanical factor is lower than that affected by electrical noise.

2: The amplitude of the variations in the signal quality of the signal affected by a mechanical factor is smaller than that affected by electrical noise.

The amplitude of the variations in the signal quality is described in detail. In the example shown in (b) of FIG. 6, the SQI value of the signal affected by a mechanical factor varies between Noise levels 2 and 3 with Noise level 2 as a reference value.

In addition, in the example shown in (c) of FIG. 6, the SQI value of the signal affected by electrical noise varies among Noise levels 1 to 6. The amplitude of variations in the SQI value of the signal affected by electrical noise tends to be greater than the amplitude of variations in the SQI value of the signal affected by a mechanical factor.

For example, the cause determination unit 1323 may determine, according to whether the amplitude of the variations in the signal quality exceeds a predetermined threshold value, whether the cause of the noise included in the signal is due to a mechanical factor or is due to electrical noise.

According to the configuration, appropriate determination can be made on whether the cause of the noise included in the signal is due to a mechanical factor or is due to electric noise.

In addition, the cause determination unit 1323 may determine that the cause of the noise included in the signal is due to a mechanical factor when the frequency of the variations in the signal quality is equal to or lower than a predetermined value. In addition, the cause determination unit 1323 may determine that the cause of the noise included in the signal is due to electrical noise when the frequency of the variations in the signal quality is higher than the predetermined value.

The signal quality of the signal affected by a mechanical factor varies in a time unit of several milliseconds, and the signal quality of the signal affected by electrical noise varies in a time unit of several microseconds. Therefore, the predetermined value described above may be a frequency of 1 kHz, or the like.

In addition, when a predetermined noise level (for example, Noise level 2) or higher continues for a predetermined period (for example, 1 msec) or longer, the cause determination unit 1323 may determine that the cause of the noise included in the signal is due to a mechanical factor. Moreover, the predetermined noise level and the predetermined period described above, which serve as the criteria for the cause determination unit 1323 to determine the cause of the noise, are values that can be appropriately set according to the configuration of the master-slave control system 1 such as the cable length or the like.

That is, the cause determination unit 1323 determines that the cause of the noise included in the signal is due to a mechanical factor when the acquired signal quality varies in a unit of milliseconds. In addition, the cause determination unit 1323 determines that the cause of the noise included in the signal is due to electrical noise when the acquired signal quality varies in a unit of microseconds.

Here, a predetermined frequency value, a predetermined noise level, and a predetermined period, which serve as the criteria for the determination, are stored in the storage unit 133 as determination information 1331.

According to the above configuration, it is possible to appropriately determine whether the cause of the noise included in the signal is due to a mechanical factor or electric noise.

In addition, the cause determination unit 1323 may perform the determination based on a degree of similarity between the variations in the signal quality and predetermined patterns.

Here, the predetermined patterns are a variation pattern of the signal quality affected by a mechanical factor and a variation pattern of the signal quality affected by electrical noise. For example, the variation pattern is a pattern of a magnitude of a noise level, duration of a predetermined noise level, and the like. The variation pattern is stored in the storage unit 133 as the determination information 1331.

That is, according to the above configuration, the cause determination unit 1323 obtains the degree of similarity by pattern matching between the variations in the signal quality and the predetermined patterns. The cause determination unit 1323 can determine a cause corresponding to a similar predetermined pattern having a higher degree of similarity (more similar) as the cause of the noise.

In addition, the cause determination unit 1323 may perform the determination with reference to a predetermined pattern corresponding to each of a plurality of causes of the noise.

For example, the plurality of causes of the noise are a mechanical factor and electrical noise.

Here, the predetermined pattern is stored in the storage unit 133 as the determination information 1331.

According to the above configuration, the cause of the noise can be determined in detail. Therefore, the user can take measures according to the determined cause of the noise.

In addition, the cause determination unit 1323 outputs a signal indicating the determination result and a signal indicating the signal quality to the determination result output control unit.

(Determination Result Output Control Unit 1324)

The determination result output control unit 1324 outputs the signal indicating the determination result of the anomaly determination unit 1322 and the cause determination unit 1323 and the signal indicating the signal quality to the display/input device 14 via the communication unit 131.

(Storage Unit 133)

The storage unit 133 is, for example, an auxiliary storage device such as a flash memory, a solid state drive or the like, and stores the above-mentioned determination information 1331 and the like.

(Display/Input Device 14)

The display/input device 14 is, for example, a touch-panel-type display/input device. The user of the master-slave control system 1 can operate the master device 13 via the display/input device 14 or check an operating state of the master-slave control system 1 by the display/input device 14. In the embodiment, in particular, the display/input device 14 displays the determination result of the master device 13, the signal quality input to the slave device 11, and the like.

Moreover, in the above embodiment, a configuration has been described in which the slave device 11 calculates the signal quality of the signal input via the cable and outputs the calculated signal quality to the master device 13. In another configuration, for example, the signal relay device 12 may have the same configuration as the signal quality calculation unit 1101 described above, and the signal relay device 12 may output the calculated signal quality to the master device 13.

In addition, an external server device of the master-slave control system 1 may receive the signal indicating the signal quality and perform cause determination processing that is performed by the master device 13 described above on the noise included in the signal. Specifically, the external server device may be a server device connected to the master device 13, or may be a cloud server device.

§ 3 Operation Example (Example of flow of processing of master device 13: Cause determination processing of noise included in signal)

Figure 7:
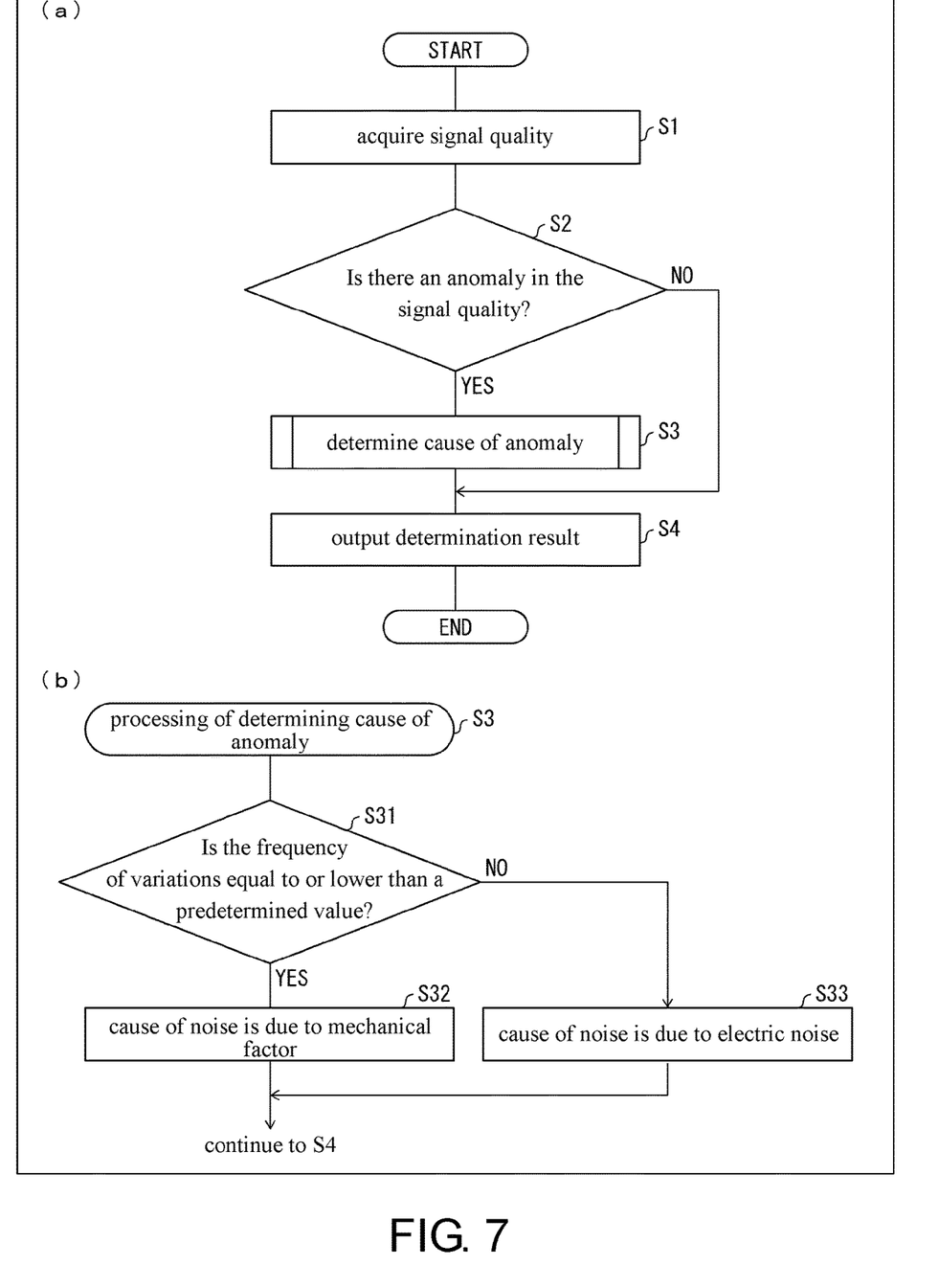

(a) and (b) of FIG. 7 are flowcharts showing an example of a flow of processing executed by the master device 13. (a) of FIG. 7 is a flowchart showing an outline of the flow of the determination processing executed by the master device 13. (b) of FIG. 7 is a flowchart showing an example of the flow of the cause determination processing of the noise included in the signal executed by the anomaly determination unit 1322. As shown in (a) of FIG. 7, the acquisition unit 1321 acquires a signal indicating the signal quality of the signal input to the slave device 11 (S1: acquisition step). Subsequently, the anomaly determination unit 1322 determines whether there is an anomaly in the signal input to the slave device 11 (S2). When there is an anomaly in the signal input to the slave device 11 (YES in S2), the cause determination unit 1323 performs the following determination. The cause determination unit 1323 determines whether the cause of the noise included in the signal input to the slave device 11 is due to a mechanical factor or is due to electrical noise (S3: cause determination step). Subsequently, the determination result output control unit 1324 outputs the determination result performed in S3 to the display/input device 14 (S4), and the processing ends. Moreover, when there is no anomaly in the signal input to the slave device 11 (NO in S2), the determination result output control unit 1324 outputs the determination result performed in S2 to the display/input device 14 (S4), and the processing ends.

Next, an example of the flow of the cause determination processing (S3) of the noise included in the signal executed by the anomaly determination unit 1322 is described with reference to (b) of FIG. 7. As shown in (b) of FIG. 7, the anomaly determination unit 1322 determines whether the frequency of the variations in the acquired signal quality is equal to or lower than a predetermined value (S31). When the frequency of the variations in the acquired signal quality is equal to or lower than the predetermined value (YES in S31), the anomaly determination unit 1322 determines that the cause of the noise included in the signal is due to a mechanical factor, and the processing continues to S4. When the frequency of the variations in the acquired signal quality exceeds the predetermined value (NO in S31), the anomaly determination unit 1322 determines that the cause of the noise included in the signal is due to electrical noise, and the processing continues to S4.

Moreover, in the above example, an example has been described in which the anomaly determination unit 1322 determines the cause of the noise included in the signal according to the frequency of the variations in the signal quality. As another example, the anomaly determination unit 1322 may determine the cause of the noise included in the signal according to a magnitude of the amplitude of the variations in the signal quality, a pattern of the frequency of the variations in the signal quality and the magnitude of the amplitude of the variations in the signal quality, and the like.

[Example of Implementation Example by Software]

A control block of the master device 13 (particularly the acquisition unit 1321, the anomaly determination unit 1322, the cause determination unit 1323, and the determination result output control unit 1324) and the signal quality calculation unit 1101 of the slave device 11 may be implemented by a logic circuit (hardware) formed in an integrated circuit (IC chip) and the like, or may be implemented by software.

In the latter case, the master device 13 and the slave device 11 include a computer that executes commands of a program which is software for implementing each function. The computer includes, for example, one or more processors and a computer-readable recording medium that stores the program. Besides, in the computer, the processor reads the program from the recording medium and executes the program, and thereby the object of the present invention is achieved. As the processor, for example, a central processing unit (CPU) can be used. As the recording medium, in addition to a "non-temporary tangible medium" such as a read only memory (ROM) or the like, a tape, a disk, a card, a semiconductor memory, a programmable logic circuit, or the like can be used. In addition, a random access memory (RAM) or the like for expanding the program may be further included. In addition, the program may be supplied to the computer via an arbitrary transmission medium (a communication network, a broadcast wave, or the like) which is capable of transmitting the program. Furthermore, one aspect of the present invention can also be implemented in a form of a data signal embedded in a carrier wave, in which the program is embodied by electronic transmission.

The present invention is not limited to the above-described embodiments, and various modifications can be made within the scope of the claims. Embodiments obtained by appropriately combining technical means respectively disclosed in different embodiments are also included in the technical scope of the present invention.

[Appendix]

One aspect of the present invention can also be expressed as follows.

An information processing device according to one aspect of the present invention includes: an acquisition unit which acquires a signal quality of a signal input via a cable; and a cause determination unit which performs cause determination for determining, from variations in the signal quality, whether a cause of noise included in the signal is due to a mechanical factor or is due to electrical noise.

In addition, a control method for information processing device according to one aspect of the present invention includes: an acquisition step of acquiring a signal quality of a signal input via a cable; and a cause determination step of performing cause determination for determining, from variations in the signal quality, whether a cause of noise included in the signal is due to a mechanical factor or is due to electrical noise.

According to the above configuration, the cause of the signal anomaly can be determined from the variations in the signal quality in the input signal. Therefore, the user can take measures according to the determined cause of the noise. That is, the user can appropriately respond to an anomaly in the signal input via the cable.

In the information processing device according to one aspect of the present invention, the cause determination unit may perform the determination according to at least one of a frequency of the variations in the signal quality and an amplitude of the variations in the signal quality.

For example, the influence of a mechanical factor on the variations in the signal quality shows the following tendency compared with the influence of electrical noise on the variations in the signal quality.

1: The frequency of the variations in the signal quality of the signal affected by a mechanical factor is lower than that affected by electrical noise.

2: The amplitude of the variations in the signal quality of the signal affected by a mechanical factor is smaller than that affected by electrical noise.

Therefore, according to the configuration, it is possible to appropriately determine whether the cause of the noise included in the signal is due to a mechanical factor or is due to electrical noise.

In the information processing device according to one aspect of the present invention, the cause determination unit may determine the cause of the noise included in the signal is due to a mechanical factor when the frequency of the variations in the signal quality is equal to or lower than a predetermined value, and determine the cause of the noise included in the signal is due to electrical noise when the frequency of the variations in the signal quality is higher than the predetermined value.

Compared with the case of being affected by electrical noise as described above, the frequency of the variations in the signal quality of the signal affected by a mechanical factor is lower. Therefore, according to the above configuration, it is possible to appropriately determine whether the cause of the noise included in the signal is due to a mechanical factor or is due to electrical noise.

In the information processing device according to one aspect of the present invention, the cause determination unit may perform the determination based on a degree of similarity between the variations in the signal quality and predetermined patterns.

Here, the predetermined patterns are, for example, a variation pattern of the signal quality affected by a mechanical factor, a variation pattern of the signal quality affected by electrical noise, and the like. That is, according to the above configuration, the cause determination unit can determine a cause corresponding to a similar predetermined pattern as the cause of the noise included in the signal by the pattern matching between the variations in the signal quality and the predetermined patterns.

In the information processing device according to one aspect of the present invention, the cause determination unit may perform the determination with reference to a predetermined pattern corresponding to each of a plurality of causes of the noise.

Here, the plurality of causes of the noise are, for example, a mechanical factor and electrical noise. According to the above configuration, the cause of the noise can be determined. Therefore, the user can take measures according to the determined cause of the noise.

In the information processing device according to one aspect of the present invention, the acquisition unit may acquire an index representing a level of the noise included in the signal as the signal quality.

Here, the index representing a level of the noise included in the signal is a value of the signal quality indicator (SQI)

or the like. According to the above configuration, it is possible to realize an information processing device that determines a cause of a signal anomaly from variations in the index.

In the information processing device according to one aspect of the present invention, the acquisition unit may acquire a signal quality of a signal input to a slave device in a master-slave control system.

According to the above configuration, the cause of the noise of the input signal in the master-slave control system can be determined.

What is claimed is:

1. An information processing device, comprising:
   a processor, configured to:
   acquire a value of a signal quality indicator of a signal input via a cable; and
   perform cause determination for determining, from variations in the value of the signal quality indicator, whether a cause of noise included in the signal is due to a mechanical factor or is due to electrical noise, wherein the mechanical factor includes mechanical vibration and cable disconnection, the electrical noise is electrical noise that is applied to the cable and mixed into the signal in the cable,
   wherein the processor performs the cause determination according to at least one of a frequency of the variations in the value of the signal quality indicator and an amplitude of the variations in the value of the signal quality indicator.

2. The information processing device according to claim 1, wherein the processor
   determines that the cause of the noise included in the signal is due to a mechanical factor when the frequency of the variations in the value of the signal quality indicator is equal to or lower than a predetermined value, and
   determines that the cause of the noise included in the signal is due to electrical noise when the frequency of the variations in the value of the signal quality indicator is higher than the predetermined value.

3. The information processing device according to claim 2, wherein the processor performs the determination based on a degree of similarity between the variations in the value of the signal quality indicator and predetermined patterns.

4. The information processing device according to claim 3, wherein the processor performs the determination with reference to a predetermined pattern corresponding to each of a plurality of causes of the noise.

5. The information processing device according to claim 2, wherein the processor acquires an index representing a level of the noise included in the signal as the value of the signal quality indicator.

6. The information processing device according to claim 2, wherein the processor acquires the value of the signal quality indicator of the signal input to a slave device in a master-slave control system.

7. The information processing device according to claim 1, wherein the processor performs the determination based on a degree of similarity between the variations in the value of the signal quality indicator and predetermined patterns.

8. The information processing device according to claim 7, wherein the processor performs the determination with reference to a predetermined pattern corresponding to each of a plurality of causes of the noise.

9. The information processing device according to claim 8, wherein the processor acquires an index representing a level of the noise included in the signal as the value of the signal quality indicator.

10. The information processing device according to claim 8, wherein the processor acquires the value of the signal quality indicator of the signal input to a slave device in a master-slave control system.

11. The information processing device according to claim 7, wherein the processor acquires an index representing a level of the noise included in the signal as the value of the signal quality indicator.

12. The information processing device according to claim 4, wherein the processor acquires the value of the signal quality indicator of the signal input to a slave device in a master-slave control system.

13. The information processing device according to claim 1, wherein the processor acquires an index representing a level of the noise included in the signal as the value of the signal quality indicator.

14. The information processing device according to claim 13, wherein the processor acquires the value of the signal quality indicator of the signal input to a slave device in a master-slave control system.

15. The information processing device according to claim 1, wherein the processor acquires the value of the signal quality indicator of the signal input to a slave device in a master-slave control system.

16. A control method for an information processing device, comprising:
    an acquisition step of acquiring a value of a signal quality indicator of a signal input via a cable; and
    a cause determination step of performing cause determination for determining, from variations in the value of the signal quality indicator, whether a cause of noise included in the signal is due to a mechanical factor or is due to electrical noise, wherein the mechanical factor includes mechanical vibration and cable disconnection, the electrical noise is electrical noise that is applied to the cable and mixed into the signal in the cable,
    wherein the cause determination step comprises:
    performing the cause determination according to at least one of a frequency of the variations in the value of the signal quality indicator and an amplitude of the variations in the value of the signal quality indicator.

* * * * *